United States Patent
Duan et al.

(10) Patent No.: US 8,688,314 B2
(45) Date of Patent: Apr. 1, 2014

(54) TUNING PARAMETER OF KALMAN FILTER IN A WHEEL INSPECTION

(75) Inventors: Ning Duan, Beijing (CN); Ke Hu, Beijing (CN); Zhong Bo Jiang, Zhejiang (CN); Wen Ting Mo, Beijing (CN); Wei Sun, Beijing (CN); Xin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 13/355,633

(22) Filed: Jan. 23, 2012

(65) Prior Publication Data

US 2012/0197485 A1    Aug. 2, 2012

(30) Foreign Application Priority Data

Jan. 30, 2011    (CN) .......................... 2011 1 0032433

(51) Int. Cl.
*G01M 17/00*    (2006.01)
*G06F 7/00*     (2006.01)

(52) U.S. Cl.
USPC .......... 701/31.4; 701/29.1; 701/29.6; 701/19; 702/33; 702/34; 702/35; 702/85; 700/28

(58) Field of Classification Search
None
See application file for complete search history.

(56) References Cited

U.S. PATENT DOCUMENTS

| | | | | |
|---|---|---|---|---|
| 5,918,951 | A * | 7/1999 | Rudd, III | 303/150 |
| 6,539,293 | B2 * | 3/2003 | Bachtiger et al. | 701/20 |
| 8,548,671 | B2 * | 10/2013 | Wong et al. | 701/29.1 |
| 2004/0064238 | A1 * | 4/2004 | Blair | 701/70 |
| 2004/0199300 | A1 * | 10/2004 | Gustafsson et al. | 701/1 |
| 2008/0195265 | A1 * | 8/2008 | Searle et al. | 701/19 |
| 2009/0091093 | A1 * | 4/2009 | Urababa et al. | 280/5.511 |
| 2009/0198350 | A1 * | 8/2009 | Thiele | 700/30 |
| 2010/0312461 | A1 * | 12/2010 | Haynie et al. | 701/117 |
| 2011/0118950 | A1 * | 5/2011 | Litt | 701/100 |
| 2011/0276203 | A1 * | 11/2011 | Hase | 701/19 |
| 2012/0259487 | A1 * | 10/2012 | Friesen et al. | 701/20 |

FOREIGN PATENT DOCUMENTS

| | | |
|---|---|---|
| CN | 1908612 A | 2/2007 |
| CN | 101566528 A | 10/2009 |
| DE | 19852229 A1 | 11/1998 |

(Continued)

OTHER PUBLICATIONS

Reid, Ian. "Applied Estimation II." (2002). http://www.robots.ox.ac.uk/~ian/Teaching/Estimation/LectureNotes2.pdf.*

Borovikov, Anna. Rienecker, Michele. Keppenne, C. Johnson, G. "Multivariate Error Covariance Estimates by Monte Carlo Simulation for Assimilation Studies in the Pacific Ocean", Monthely Weather Review 2003, vol. 133 p. 2310-2334.*

Marquez, Schmid, A digital filter-based approach to the remote condition monitoring of railway turnouts, Reliability Engineering and System Safety, Jun. 6, 2006, pp. 830-840.

(Continued)

*Primary Examiner* — Thomas Black
*Assistant Examiner* — Paul Castro
(74) *Attorney, Agent, or Firm* — Cantor Colburn LLP

(57) ABSTRACT

A method for tuning a parameter of a Kalman filter in a wheel inspection for a vehicle. The method includes: associating wheel inspection data of the vehicle with locations of wheels in the vehicle; evaluating a wheel stable score of the vehicle based on the wheel inspection data and the association, wherein the wheel stable score indicates reliability of the wheel inspection; and tuning measurement error covariance of the Kalman filter according to the evaluated wheel stable score. By using the method, the parameter of the Kalman filter can be dynamically tuned to enable the Kalman filter to filter more accurately to ensure the correct result of the wheel inspection. In addition, an apparatus for tuning a parameter of a Kalman filter and a wheel inspection system for a vehicle are disclosed.

11 Claims, 5 Drawing Sheets

(56) References Cited

FOREIGN PATENT DOCUMENTS

| FR | 2916409 A1 | 11/2008 |
|---|---|---|
| JP | 11286268 | 10/1999 |
| JP | 2008164578 | 7/2008 |
| WO | WO/99/37520 A1 | 7/1999 |

OTHER PUBLICATIONS

Guy Charles et. al., Condition Monitoring Approaches to Estimating Wheel-Rail Profile, Control Systems Group, Electronic & Electrical Engineering, Loughborough University, UK.

Christopher P. Ward et. al., Condition Monitoring of Rail Vehicle Bogies, Department of Electronic and Electrical Engineering, Loughborough University, Loughborough, UK.

Christopher P. Ward et. al., Condition monitoring opportunities using vehicle-based sensors, Proc. IMechE vol. 224 Part F: J. Rail and Rapid Transit, Jul. 21, 2010.

Mark Judd et. al., Route mapping for railway asset management, Geomatics World Nov./Dec. 2005.

Feng et. al., Integrated control strategies for railway vehicles with independently-driven wheel motors, Front. Mech. Eng. China 2008, 3(3): 239-250.

* cited by examiner

US 8,688,314 B2

TUNING PARAMETER OF KALMAN FILTER IN A WHEEL INSPECTION

CROSS REFERENCE TO RELATED APPLICATION

The present invention claims priority under 35 U.S.C. 119 from Chinese Application 201110032433.1, filed Jan. 30, 2011, the entire contents of which are incorporated herein by reference.

BACKGROUND OF THE INVENTION

1. Field of the Invention

The present invention relates to wheel inspection technology for a vehicle, and particularly, to a method and apparatus for tuning a parameter of a Kalman filter in a wheel inspection to remove noises in wheel inspection data more effectively.

2. Description of Related Art

For railway vehicles, especially for high speed railway vehicles, wheels are very important and costive assets. Generally, each wheel costs about $10,000, and a rolling stock has about 100 wheels. Given this, the cost of the wheels in one vehicle is very high. In addition, the wheels directly impact the vehicle's speed, safety and comfort.

To minimize wheel failure and to avoid catastrophic events, railway operators are usually equipped with a wheel inspection system to monitor relevant parameters of the wheels and to detect abnormal conditions of the wheels. In the existing wheel inspection systems, usually sensors are installed on the rail and are used to measure the relevant parameters of the wheels. This wheel data is then provided to a status inspection system to analyze whether the shape of the wheel is circular, whether the wheel is worn down, what the wheel diameter difference is, etc., to help the operators know the status of the wheels. In general, the detected relevant parameters of the wheel include a wheel profile and wheel diameter value.

It is well known that there exists noise in the wheel data measured by the sensors, which would cause an error in the analysis result of the wheel data, and may make the analysis result meaningless or generate false alarms. Therefore, it is necessary to remove the noise in the wheel inspection data to ensure that the analysis result can indicate the current status of the wheels accurately. Thus, Kalman filtering technology is often effectively used in the existing wheel inspection system to remove the noise in the signals.

The basic idea of the Kalman filter is to calculate an estimation value of the current status based on the estimation value of the previous status and the measurement value of the current status—It is a kind of recursive estimation. The operation of the Kalman filter includes two phases: prediction and update. In the prediction phase, the current status is predicted based on the estimation value of the previous status. In the update phase, the prediction value obtained in the prediction phase is optimized based on the measurement value of the current status to obtain the more accurate new estimation value.

In the prediction phase, the current status is predicted under formula (1):

$$\hat{x}_k^- = A x_{k-1} \quad (1)$$

where $\hat{x}_k^-$ represents the status prediction value for time k, A represents a status transition matrix, and $x_{k-1}$ represents the status estimation value for time k−1. Thus the prediction value of the prediction estimation covariance for time k is:

$$P_k^- = A P_{k-1} A^T + Q \quad (2)$$

where $P_k^-$ represents the prediction value of the prediction estimation covariance for time k and $P_{k-1}$ represents the estimation value of the prediction estimation covariance for time k−1.

In the update phase, Kalman gain is calculated from formula (3):

$$K_k = P_k^- (P_k^- + R)^{-1} \quad (3)$$

where $K_k$ represents the gain for time k, and R represents the measurement error covariance and is a constant. Then, the status prediction value for time k is updated under formula (4) to obtain the new status estimation value:

$$\hat{x}_k = \hat{x}_k^- + K_k (z_k - \hat{x}_k^-) \quad (4)$$

where $\hat{x}_k$ represents the status estimation value for time k, and $z_k$ represents the status measurement value for time k. In addition, the prediction value of the prediction estimation covariance is updated under formula (5) to obtain the new estimation value of the prediction estimation covariance:

$$P_k = (I - K_k) P_k^- \quad (5)$$

where $P_k$ represents the estimation value of the prediction estimation covariance for time k.

In the Kalman filter, the Kalman gain $K_k$ is in fact a balance factor for the prediction estimation covariance $P_k$ and the measurement error covariance R. If the measurement error covariance R is close to 0, the Kalman gain $K_k$ is close to 1, and the updated status estimation value $\hat{x}_k$ is close to the status measurement value $z_k$. If the prediction estimation covariance $P_k$ is close to 0, the Kalman gain $K_k$ is also close to 0, and the updated status estimation value $\hat{x}_k$ is close to the status prediction value $\hat{x}_k^-$.

In the use of the Kalman filter, the measurement error covariance R is usually unchanged. However, in practice, the measurement error covariance R cannot remain unchanged. For example, in the case that the weather condition is changed or the working time is long, the sensors installed on the rail will be affected, leading to the measurement error covariance R being changed. Once the parameter of the Kalman filter is inappropriate, the signal noise remove effect will be decreased, easily resulting in the wrong analysis result. Therefore, it is necessary to consider the changes of the measurement error covariance R of the Kalman filter in the wheel inspection to make the estimation result of the Kalman filter more accurate.

SUMMARY OF THE INVENTION

The present invention provides a method for tuning a parameter of a Kalman filter in a wheel inspection for a vehicle, including: associating wheel inspection data of the vehicles with locations of corresponding wheels in the vehicle; evaluating a wheel stable score of the vehicle based on the wheel inspection data and the association, wherein the wheel stable score indicates reliability of the wheel inspection; and tuning a measurement error covariance of the Kalman filter according to the evaluated wheel stable score.

According to another aspect, the present invention provides an apparatus for tuning a parameter of a Kalman filter in a wheel inspection for a vehicle, including: an association module that associates wheel inspection data of the vehicles with locations of corresponding wheels in the vehicle; an evaluation module that evaluates a wheel stable score of the vehicle based on the wheel inspection data and the association, wherein the wheel stable score indicates reliability of the wheel inspection; and a parameter tuning module that tunes a measurement error covariance of the Kalman filter according to the evaluated wheel stable score.

According to another aspect of the present invention, a wheel inspection system for a vehicle, including: a plurality of sensors that measure parameters of wheels of the vehicle; an apparatus for tuning a parameter of a Kalman filter in a wheel inspection for a vehicle, including: an association module that associates wheel inspection data of the vehicles with locations of corresponding wheels in the vehicle; an evaluation module that evaluates a wheel stable score of the vehicle based on the wheel inspection data and the association, wherein the wheel stable score indicates reliability of the wheel inspection; and a parameter tuning module that tunes a measurement error covariance of the Kalman filter according to the evaluated wheel stable score; and a Kalman filter that detects statuses of the wheels according to the measured parameters of the wheels.

DETAILED DESCRIPTION OF THE PREFERRED EMBODIMENTS

It is believed that the above and other objects, features and advantages of the present invention will become more apparent from the following detailed description of the preferred embodiments of the present invention in conjunction with the drawings.

Figure 1:
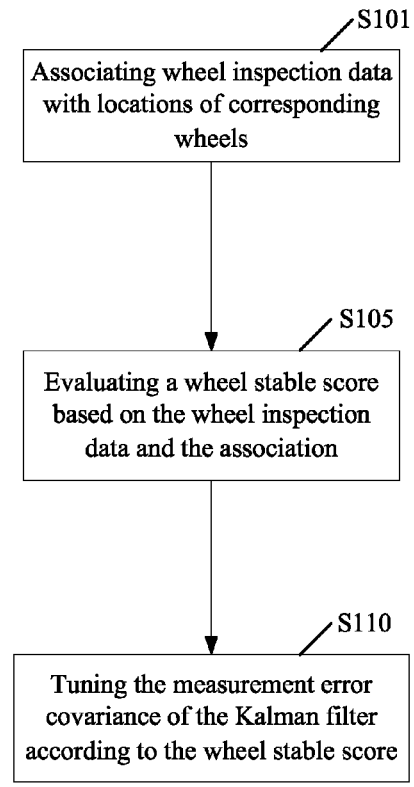
FIG. 1 is a schematic flow chart of a method for tuning a parameter of a Kalman filter in a wheel inspection for a vehicle according to an embodiment of the invention.

FIG. 1 is a schematic flow chart of a method for tuning a parameter of a Kalman filter in a wheel inspection for a vehicle according to an embodiment of the invention. The embodiment will be described below in detail in conjunction with the figure.

The method of this embodiment is based on the following two points: 1) the wheels in the same car, bogie or axle of the vehicle should have substantially the same wheel diameter value and similar wear; and 2) if the measurement result of the sensor as a measurement apparatus is not stable, the measurement result of the sensor tends to be an error. Thus, the reliability of the wheel measurement performed by the sensor can be evaluated by comparing the difference of the wheel diameter values of the wheels in the same axle, bogie or car, thereby determining whether the measurement noise of the sensor has changed and further determining whether the parameter of the Kalman filter needs to be tuned.

In the following description, the railway vehicle is described as an example. It is well known that the railway vehicle includes multiple cars. Each car has front and rear bogies, each bogie has front and rear axles, and each axle has left and right wheels. Typically, one railway vehicle has 12 cars, 24 bogies, 48 axles and 96 wheels.

As shown in FIG. 1, in step S101, the wheel inspection data of the vehicle is associated with the locations of the wheels in the vehicle. In this embodiment, the sensors arranged on the rails measure the relevant parameters of the wheels of the passing vehicle, e.g. the wheel diameter values of the wheels, to obtain the wheel inspection data. Then, this wheel inspection data is associated with the locations of the respective wheels.

Figure 2:
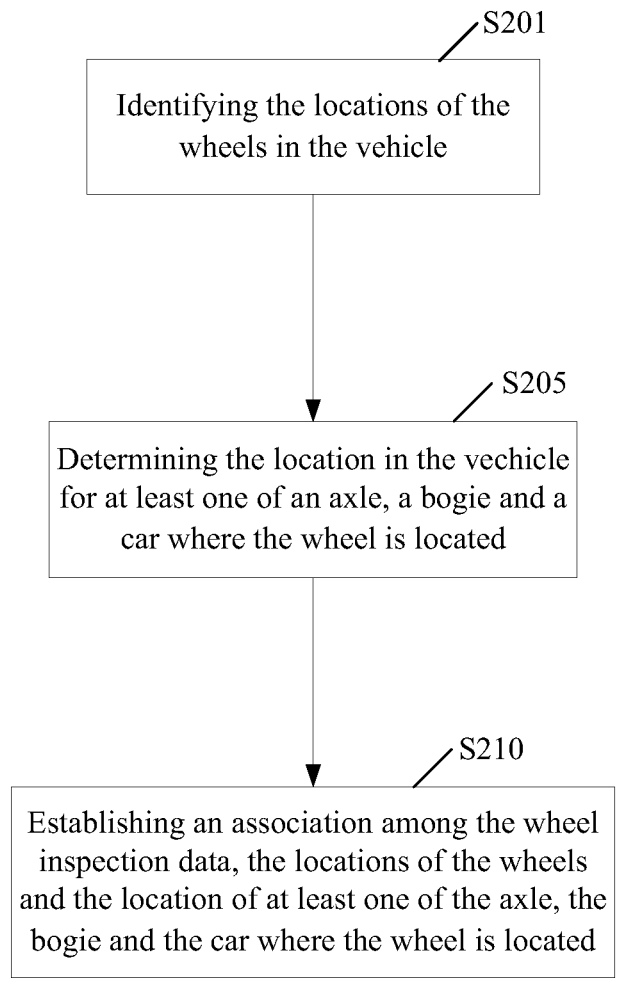
FIG. 2 is a schematic flow chart of the step of associating wheel inspection data with locations of wheels in the vehicle in the method of the embodiment shown in FIG. 1.

FIG. 2 shows a schematic flow chart of the associating step. As shown in FIG. 2, in step S201, the locations of the wheels in the vehicle are identified. For example, the locations of the wheels can be identified from vehicle head to vehicle tail and from left to right towards the vehicle head. In this case, the locations of the wheels can be expressed as 1_L, 1_R, 2_L, 2_R, 3_L, 3_R . . . . Next, in step S205, the location of at least one of the axle, bogie and car where the wheel is located in the vehicle is determined. In the above example, according to the structure of the vehicle, the locations of the axle, bogie and car where the wheels 1_L and 1_R are located are 1, 1, 1 respectively, the locations of the axle, bogie and car where the wheels 2_L and 2_R are located are 2, 1, 1 respectively, and the locations of the axle, bogie and car where the wheels 3_L and 3_R are located are 3, 2, 1 respectively. Then, in step S210, the association is established among the wheel inspection data, the locations of the wheels and the location of the at least one of the axle, bogie and car where the wheel is located. In this embodiment, an association table can be built to represent the relationship between the wheel inspection data and the locations of the wheels, as shown in Table 1:

TABLE 1

| Location of Wheel | Location of Axle | Location of Bogie | Location of Car | Wheel Inspection Data |
|---|---|---|---|---|
| 1_L | 1 | 1 | 1 | 841.1 |
| 1_R | 1 | 1 | 1 | 841.3 |
| 2_L | 2 | 1 | 1 | 842.9 |
| 2_R | 2 | 1 | 1 | 846 |
| 3_L | 3 | 2 | 1 | 845.2 |
| 3_R | 3 | 2 | 1 | 845.6 |
| ... | ... | ... | ... | |

Based on such association, the wheel inspection data from the sensors are structuralized so as to provide a basis for the evaluation of the wheel stable score described later.

Figure 3:
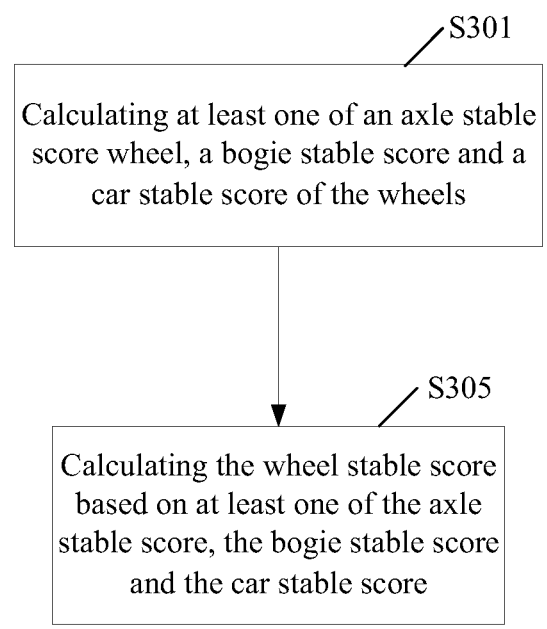
FIG. 3 is a schematic flow chart of the step of evaluating a wheel stable score in the embodiment shown in FIG. 1.

Returning to FIG. 1, in step S105, the wheel stable score of the vehicle is evaluated based on the wheel inspection data from the sensors and the association established in step S101, wherein the wheel stable score indicates the reliability of the wheel inspection. Referring to FIG. 3, the step of evaluating the wheel stable score is described in detail below.

As shown in FIG. 3, in step S301, at least one of an axle stable score, a bogie stable score and a car stable score of the wheels of the whole vehicle is calculated. The method for calculating the axle stable score, the method for calculating the bogie stable score and the method for calculating the car stable score are described below, respectively. In the following description, the wheel diameter value of the wheel is used as the wheel inspection data. Those skilled in the art can understand that other parameter values measured by the sensors can also be used as the wheel inspection data, such as wheel profile thickness, wheel profile height, etc.

(I) Method for Calculating the Axle Stable Score

First, an average value of a coaxial wheel diameter difference between the left and right wheels in the same axle is calculated. The coaxial wheel diameter difference refers to the difference between the wheel diameter values of the wheels in the same axle. In this embodiment, the average value of the coaxial wheel diameter difference can be calculated using formula (6):

$$\overline{Diameter_{axle}} = \sum_{i=1,2,\ldots,N} \frac{|Diameter_{i\_L} - Diameter_{i\_R}|}{N} \quad (6)$$

where $\overline{Diameter_{axle}}$ represents the average value of the coaxial wheel diameter difference, N represents the number of the axles, $Diameter_{i\_L}$ represents the wheel diameter value of the left wheel in the $i^{th}$ axle, and $Diameter_{i\_R}$ represents the wheel diameter value of the right wheel in the $i^{th}$ axle. Then, a current coaxial wheel diameter difference deviation score is calculated based on the calculated average value of the coaxial wheel diameter difference and a predetermined mean value and variance of a normal coaxial wheel diameter difference distribution. Usually, the normal coaxial wheel diameter difference distribution is a normal distribution whose mean value and variance can be obtained in advance by means of Statistical Product and Service Solutions (SPSS) training. In this embodiment, the current coaxial wheel diameter difference deviation score can be calculated from formula (7):

$$Index = \frac{\overline{Diameter_{axle}} - \overline{D_{axle}}}{\sigma_{axle}} \quad (7)$$

where Index represents the coaxial wheel diameter difference deviation score, and $\overline{D_{axle}}$ and $\sigma_{axle}$ represent the mean value and variance of the normal coaxial wheel diameter difference distribution, respectively. Of course, those skilled in the art can understand that the coaxial wheel diameter difference deviation score can be calculated using other methods. Then, the axle stable score of the wheels is determined according to the calculated current coaxial wheel diameter difference deviation score. If the coaxial wheel diameter difference deviation score is less than a first threshold, the axle stable score is equal to 0. If the coaxial wheel diameter difference deviation score is greater than or equal to the first threshold, the axle stable score is equal to the difference between the coaxial wheel diameter difference deviation score and the constant 1, as indicated by formula (8):

$$Index_{axle} = \begin{cases} 0, & \text{when Index} < \text{first threshold} \\ Index - 1, & \text{when Index} \geq \text{first threshold} \end{cases} \quad (8)$$

where $Index_{axle}$ represents the axle stable score. The first threshold can be predetermined by a user and is usually greater than 1.

(II) Method for Calculating the Bogie Stable Score

First, a wheel diameter difference between the left wheels and a wheel diameter difference between the right wheels in two axles in the same bogie are calculated, i.e., $|Diameter_{i\_L} - Diameter_{i+1\_L}|$ and $|Diameter_{i\_R} - Diameter_{i+1\_R}|$, as a co-bogie wheel diameter difference. Then, an average value of the co-bogie wheel diameter difference of all bogies is calculated, as indicated by formula (9):

$$\overline{Diameter_{bogie}} = \sum_{i=1,3,5,\ldots,(N/2-1)} \frac{|Diameter_{i\_L} - Diameter_{i+1\_L}| +}{N/2} \quad (9)$$

where $\overline{Diameter_{bogie}}$ represents the average value of the co-bogie wheel diameter difference. Then a current co-bogie wheel diameter difference deviation score is calculated based on the calculated average value of the co-bogie wheel diameter difference and a predetermined mean value and variance of a normal co-bogie wheel diameter difference distribution. Usually, the normal co-bogie wheel diameter difference distribution is a normal distribution whose mean value and variance can be obtained by means of Statistical Product and Service Solutions (SPSS) training. In this embodiment, the co-bogie wheel diameter difference deviation score can be calculated from formula (10):

$$Index = \frac{\overline{Diameter_{bogie}} - \overline{D_{bogie}}}{\sigma_{bogie}} \quad (10)$$

where Index represents the co-bogie wheel diameter difference deviation score, and $\overline{D_{bogie}}$ and $\sigma_{bogie}$ represent the mean value and variance of the normal co-bogie wheel diameter difference distribution, respectively. Of course, those skilled in the art can understand that the co-bogie wheel diameter difference deviation score can be calculated using other methods. Then, the bogie stable score is determined according to the calculated current co-bogie wheel diameter difference deviation score. In this embodiment, if the co-bogie wheel diameter difference deviation score is less than a second threshold, the bogie stable score is equal to 0. If the co-bogie wheel diameter difference deviation score is greater than or equal to the second threshold, the bogie stable score is equal to the difference between the co-bogie wheel diameter difference deviation score and the constant 1, as indicated by formula (11):

$$Index_{bogie} = \begin{cases} 0, & \text{when Index} < \text{second threshold} \\ Index - 1, & \text{when Index} \geq \text{second threshold} \end{cases} \quad (11)$$

where $Index_{bogie}$ represents the bogie stable score. In addition, the second threshold can be predetermined by the user and is usually greater than 1.

In the above method for calculating the bogie stable score, the case where a bogie has two axles is described, but those skilled in the art can understand that this method can also be applied, with slight modifications, to the case where a bogie has more than two axles.

(III) Method for Calculating the Car Stable Score

First, average values of the wheel diameter values of the left and right wheels in two bogies in the same car are calculated, as indicated by formulas (12) and (13):

$$\overline{Diameter_{i\_f\_bogie}} = \frac{Diameter_{8(i-1)+1\_L} + Diameter_{8(i-1)+1\_R} +}{4} \quad (12)$$
$$\phantom{\overline{Diameter_{i\_f\_bogie}} = } \frac{Diameter_{8(i-1)+2\_L} + Diameter_{8(i-1)+2\_R}}{4}$$

$$\overline{Diameter_{i\_b\_bogie}} = \frac{Diameter_{8(i-1)+3\_L} + Diameter_{8(i-1)+3\_R} +}{4} \frac{Diameter_{8(i-1)+4\_L} + Diameter_{8(i-1)+4\_R}}{4} \quad (13)$$

where $\overline{Diameter_{i\_f\_bogie}}$ represents the average value of the wheel diameter values of the wheels in the front bogie in the $i^{th}$ car, and $\overline{Diameter_{i\_b\_bogie}}$ represents the average value of the wheel diameter values of the wheels in the rear bogie in the $i^{th}$ car. Next, the wheel diameter difference between the two bogies is calculated, i.e. $|\overline{Diameter_{i\_f\_bogie}} - \overline{Diameter_{i\_b\_bogie}}|$, as a co-car wheel diameter difference. Then, an average value of the co-car wheel diameter difference of all cars is calculated, as indicated by formula (14):

$$\overline{Diameter_{car}} = \sum_{i=1,2,\ldots,N/4} \frac{|\overline{Diameter_{i\_f\_bogie}} - \overline{Diameter_{i\_b\_bogie}}|}{N/4} \quad (14)$$

Then, a current co-car wheel diameter difference deviation score is calculated based on the calculated average value of the co-car wheel diameter difference and a predetermined mean value and variance of a normal co-car wheel diameter difference distribution. Usually, the normal co-car wheel diameter difference distribution under normal circumstances is a normal distribution whose mean value and variance can be obtained by means of Statistical Product and Service Solutions (SPSS) training. In this embodiment, the co-car wheel diameter difference deviation score can be calculated from formula (15):

$$Index = \frac{\overline{Diameter_{car}} - \overline{D_{car}}}{\sigma_{car}} \quad (15)$$

where Index represents the co-car wheel diameter difference deviation score, and $\overline{D_{car}}$ and $\sigma_{car}$ represent the mean value and variance of the normal co-car wheel diameter difference distribution, respectively. Of course, those skilled in the art can understand that the co-car wheel diameter difference deviation score can be calculated using other methods. Then, the car stable score is determined according to the calculated current co-car wheel diameter difference deviation score. In this embodiment, if the co-car wheel diameter difference deviation score is less than a third threshold, the car stable score is equal to 0. If the co-car wheel diameter difference deviation score is greater than or equal to the third threshold, the car stable score is equal to the difference between the co-car wheel diameter difference deviation score and the constant 1, as indicated by formula (16):

$$Index_{car} = \begin{cases} 0, & \text{when } Index < \text{third threshold} \\ Index - 1, & \text{when } Index \geq \text{third threshold} \end{cases} \quad (16)$$

where $Index_{car}$ represents the car stable score. The third threshold can be predetermined by the user and is usually greater than 1.

In the above method for calculating the car stable score, the case where a car has two bogies is described, but those skilled in the art can understand that this method can also be applied, with slight modifications, to the case where a car has more than two bogies.

Then, in step S305, the wheel stable score is calculated based on at least one of the axle stable score, the bogie stable score and the car stable score calculated in step S301. In this embodiment, the wheel stable score is calculated as a weight sum of the axle stable score, the bogie stable score and the car stable score, wherein each of the weights of the respective stable scores is not less than 0 and not greater than 1, and the sum of the weights is equal to 1, as indicated by formula (17):

$$StableIndex = w_1 Index_{axle} + w_2 Index_{bogie} + w_3 Index_{car} \quad (17)$$

where StableIndex represents the wheel stable score, and $w_1$, $w_2$, $w_3$ represent the weights of the axle stable score $Index_{axle}$, the bogie stable score $Index_{bogie}$ and the car stable score $Index_{car}$, respectively.

If any one of the axle stable score, the bogie stable score and the car stable score is calculated, the weight of the calculated stable score is set to 1 and the weights of the other stable scores are set to 0. If any two of the axle stable score, the bogie stable score and the car stable score are calculated, the weight of the non-calculated stable score is set to 0.

Back again to FIG. 1, in step S110, the measurement error covariance of the Kalman filter is tuned based on the wheel stable score evaluated in step S105. As mentioned above, if the measurement error covariance of the Kalman filter always remains unchanged, it might lead to inaccurate filtering of the Kalman filter; therefore it is necessary to tune the measurement error covariance.

In this embodiment, first, the evaluated wheel stable score is compared with a predetermined stable threshold. The stable threshold, as an upper limit of the wheel stable score, can be preset and stored by the user. If the wheel stable score is less than the stable threshold, which indicates that the measurement of the wheel parameters by the sensors is normal, then the measurement error covariance of the Kalman filter cannot be tuned. If the wheel stable score is greater than or equal to the stable threshold, the measurement error covariance would be tuned.

Further, in order to avoid frequently tuning the measurement error covariance, it is further determined, when the comparison result is that the wheel stable score is greater than or equal to the stable threshold, whether the times of consecutive occurrences of the wheel stable score being greater than or equal to the stable threshold exceeds a predetermined number of times. If the number of times of the consecutive occurrences exceeds the predetermined number of times, the measurement error covariance would be tuned. If the number of times of consecutive occurrences is less than the predetermined number of times, the measurement error covariance is not tuned. Assuming that the predetermined number of times is set to M, then the times of the consecutive occurrences exceeding the predetermined times means that M−1 wheel stable scores obtained in the previous M−1 measurements before this measurement are greater than or equal to the stable threshold.

In fact, the measurement error covariance and the wheel stable score satisfy a linear relationship, namely $$R = A(f(StableIndex) - f(StableIndex_{threshold})) + R_0 \quad (18)$$

where R represents the tuned measurement error covariance, A is a constant, $f(\cdot)$ represents a linear function, StableIndex represents the calculated wheel stable score, $StableIndex_{threshold}$ represents the stable threshold, and $R_0$ represents the initial measurement error covariance. The constant A and the linear function $f(\cdot)$ can be obtained by training and vary with the vehicle.

The initial measurement error covariance $R_0$ can be calculated as follows. The wheel diameter measurement value during wheel truing is selected as a wheel diameter measurement true value, including a measurement true value before the wheel truing and a measurement true value after the wheel truing. The measurement data before and after wheel truing measured by the sensors at the time nearest to the wheel truing are selected, and the difference between the measurement data and the measurement true value is calculated as a measurement error. Then the initial measurement error covariance $R_0$ can be obtained according to a wheel diameter difference training model.

Therefore, the measurement error covariance can be tuned according to the above formula (18).

Although the railway vehicle is described as an example in this embodiment, those skilled in the art can understand that the method of the embodiment can also be applied to other kind of vehicles with similar structures.

It can be seen from the above description that the method for tuning a parameter of a Kalman filter in wheel inspection for a vehicle of this embodiment dynamically tunes the measurement error covariance of the Kalman filter by utilizing the vehicle's structure features, associating the wheel inspection data with the locations of the wheels, and evaluating the wheel stable score of the vehicle, so as to make the analysis result of the Kalman filter more accurate. In addition, the method of the embodiment is easy to implement.

Figure 4:
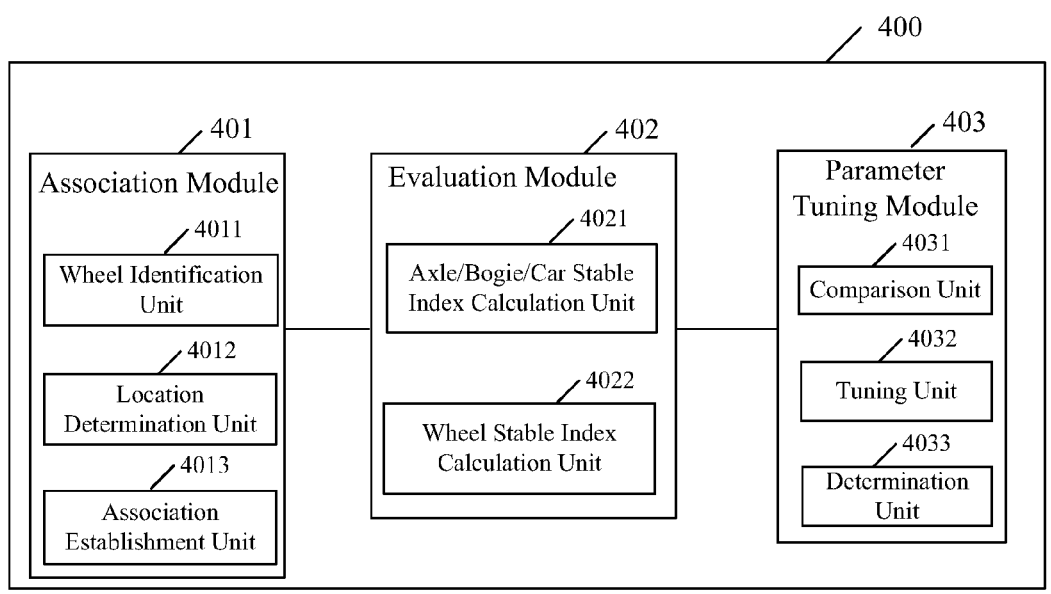
FIG. 4 is a schematic block diagram of an apparatus for tuning a parameter of a Kalman filter in a wheel inspection for a vehicle according to an embodiment of the invention.

Under the same inventive concept, FIG. 4 shows a schematic block diagram of an apparatus 400 for tuning a parameter of a Kalman filter in a wheel inspection for a vehicle according to an embodiment of the present invention. The embodiment will be described below in detail in conjunction with the figure, wherein for the same portions as those in the previous embodiment, the description thereof is omitted properly.

As shown in FIG. 4, the apparatus 400 for tuning a parameter of a Kalman filter in a wheel inspection for a vehicle of this embodiment includes: association module 401 which associates the wheel inspection data of the vehicle with the locations of the wheels in the vehicle; evaluation module 402 which evaluates the wheel stable score of the vehicle based on the wheel inspection data and the association established in the association module 401, wherein the wheel stable score indicates the reliability of the wheel inspection; and parameter tuning module 403 which tunes the measurement error covariance of the Kalman filter according to the evaluated wheel stable score.

The parameters of the wheels (such as the wheel diameter value) measured by the sensors are provided to the apparatus 400 as the wheel inspection data. First, the associations between the wheel inspection data and the locations of the wheels are established in the association module 401. In the association module 401, wheel identification unit 4011 identifies the locations of the wheels in the vehicle, for example, the locations of the wheels can be identified as 1_L, 1_R, 2_L, 2_R, 3_L, 3_R . . . . Then, in location determination unit 4012, the location of at least one of the axle, bogie and car where the wheel is located in the vehicle is determined, and in association establishment unit 4013, the association is established among the wheel inspection data, the locations of the wheels and the location of at least one of the axle, bogie and car where the wheel is located.

The wheel inspection data structuralized by the association module 401 are provided to the evaluation module 402 to evaluate the wheel stable score of the vehicle so as to determine the reliability of this wheel inspection. In the evaluation module 402, axle/bogie/car stable score calculation unit 4021 calculates at least one of the axle stable score, the bogie stable score and the car stable score of the wheels.

Figure 5:
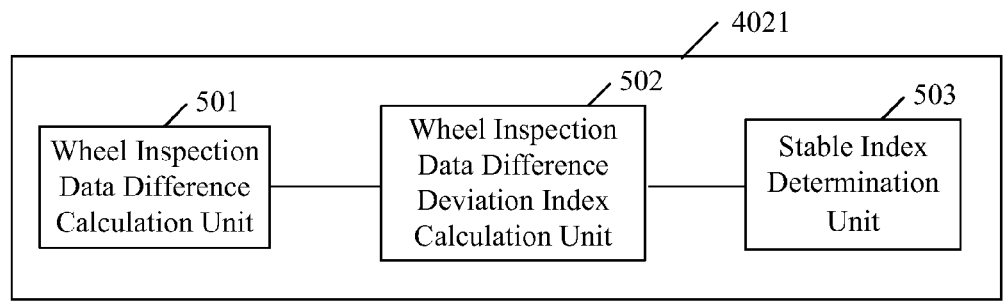
FIG. 5 is a schematic block diagram of axle/bogie/car stable score calculation unit in the apparatus of the embodiment shown in FIG. 4.

FIG. 5 shows a schematic block diagram of the axle/bogie/car stable score calculation unit 4021. As shown in FIG. 5, the axle/bogie/car stable score calculation unit 4021 includes wheel inspection data difference calculation unit 501, wheel inspection data difference deviation score calculation unit 502 and stable score determination unit 503. In the following description, the wheel diameter value of the wheel is used as the wheel inspection data. Those skilled in the art can understand that other parameter values measured by the sensors can also be used as the wheel inspection data.

In the calculation of the axle stable score, first, wheel inspection data difference calculation unit 501 calculates the average value of the coaxial wheel diameter difference between the left and right wheels in the same axle, for example, according to the foregoing formula (6). Then, wheel inspection data difference deviation score calculation unit 502 calculates the current coaxial wheel diameter difference deviation score based on the average value of the coaxial wheel diameter difference and the predetermined mean value and variance of the normal coaxial wheel diameter difference distribution, for example, according to the foregoing formula (7). Finally, stable score determination unit 503 determines the axle stable score of the wheels according to the calculated current coaxial wheel diameter difference deviation score, for example, according to the foregoing formula (8).

In the calculation of the bogie stable score, first, the wheel inspection data difference calculation unit 501 calculates the wheel diameter difference between the left wheels and the wheel diameter difference between the right wheels in two axles in the same bogie as the co-bogie wheel diameter difference. It also calculates the average value of the co-bogie wheel diameter difference of all bogies, for example, according to the foregoing formula (9). Then, the wheel inspection data difference deviation score calculation unit 502 calculates the current co-bogie wheel diameter difference deviation score based on the calculated average value of the co-bogie wheel diameter difference and the predetermined mean value and variance of the normal co-bogie wheel diameter difference distribution, for example, according to the foregoing formula (10). Then, the stable score determination unit 503 determines the bogie stable score of the wheels according to the calculated current co-bogie wheel diameter difference deviation score, for example, according to the foregoing formula (11). In the above calculation of the bogie stable score, the case where a bogie has two axles is described, but those skilled in the art can understand that the related formulas can be applied to the case where a bogie has more than two axles, with adaptive modifications.

In the calculation of the car stable score, first, the wheel inspection data difference calculation unit 501 calculates the average values of the wheel diameter values of the left and right wheels in two bogies in the same car, for example, according to the foregoing formulas (12) and (13); and calculates the wheel diameter difference between the two bogies as the co-car wheel diameter difference. It then calculates the average value of the co-car wheel diameter difference of all cars, for example, according to the foregoing formula (14). Then, the wheel inspection data difference deviation score calculation unit 502 calculates the current co-car wheel diameter difference deviation score based on the calculated average value of the co-car wheel diameter difference and the predetermined mean value and variance of the normal co-car wheel diameter difference distribution, for example, according to the foregoing formula (15). Then, the stable score determination unit 503 determines the car stable score of the wheels according to the calculated current co-car wheel diameter difference deviation score, for example, according to the foregoing formula (16). In the above calculation of the car stable score, the case where a car has two bogies is described, but those skilled in the art can understand that the related formulas can be applied to the case where a car has more than two bogies, with adaptive modifications.

Returning to FIG. 4, after at least one of the axle stable score, the bogie stable score and the car stable score is calculated by the axle/bogie/car stable score calculation unit 4021, wheel stable score calculation unit 4022 calculates the wheel stable score using at least one of the axle stable score, the bogie stable score and the car stable score, for example, according to the foregoing formula (17). In the wheel stable score calculation unit 4022, the wheel stable score is calculated as the weight sum of the axle stable score, the bogie stable score and the car stable score, wherein each of the weights of the respective stable scores is not less than 0 and not greater than 1, and the sum of the weights is equal to 1.

The wheel stable score evaluated by the evaluation module 402 is provided to the parameter tuning module 403 to determine whether the measurement error covariance of the Kalman filter needs to be tuned. In the parameter tuning module 403, comparison unit 4031 compares the wheel stable score with the predetermined stable threshold, and if the wheel stable score is greater than or equal to the stable threshold, tuning unit 4032 tunes the measurement error covariance.

Further, the parameter tuning module 403 can include determination unit 4033. When the result of the comparison unit 4031 is that the wheel stable score is greater than or equal to the stable threshold, the determination unit 4033 determines whether the times of the consecutive occurrences of the case where the wheel stable score is greater than or equal to the stable threshold exceeds a predetermined number of times. If the number of times of consecutive occurrences exceeds the predetermined number of times, the tuning unit 4032 tunes the measurement error covariance. Thus, the measurement error covariance would not need to be tuned frequently.

In this embodiment, the tuning unit 4032 tunes the measurement error covariance according to the foregoing formula (18).

It should be noted that the apparatus 400 for tuning a parameter of a Kalman filter in wheel inspection for a vehicle of this embodiment can operatively implement the method for tuning a parameter of a Kalman filter in wheel inspection for a vehicle as shown in FIGS. 1 to 3.

Figure 6:
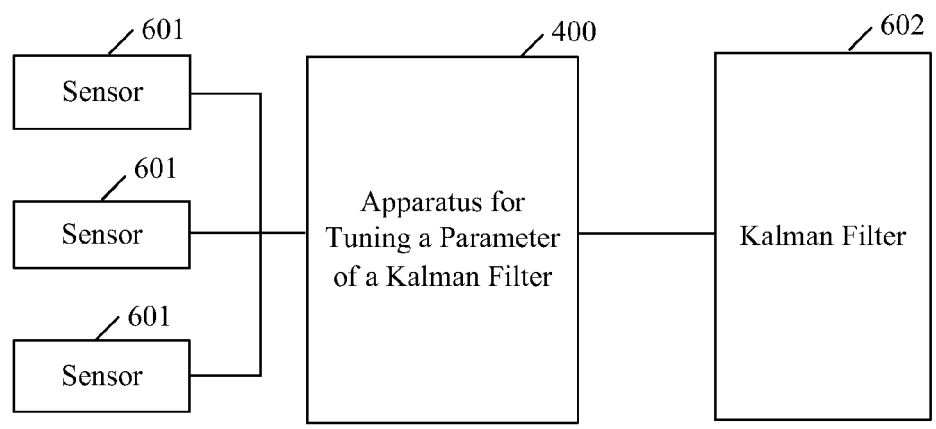
FIG. 6 is a schematic block diagram of a wheel inspection system for a vehicle according to one embodiment of the invention.

FIG. 6 shows a wheel inspection system for a vehicle according to one embodiment of the present invention. The wheel inspection system includes: a plurality of sensors 601 which measure the parameters of the wheels of the vehicle; the apparatus 400 for tuning a parameter of a Kalman filter in wheel inspection for a vehicle as shown in FIG. 4; and a Kalman filter 602 which detects the status of the wheels based on the measured parameters of the wheels from the plurality of sensors.

The method disclosed in the above embodiments may be implemented in hardware, software, or combinations thereof. The hardware portion may be implemented by dedicated logic. For example, the apparatus for tuning a parameter of a Kalman filter in a wheel inspection for a vehicle and its components in the embodiment may be implemented by hardware circuits such as large scale Integrated circuits or gate arrays, semiconductors such as logic chips, transistors, or programmable hardware devices such as field programmable gate arrays, programmable logic devices, etc., or may be implemented by software which can be executed by various processors, or may be implemented by the combination of the above hardware circuits and software. The software portion can be stored in a memory and may be executed by an appropriate instruction execution system, such as microprocessor, personal computer (PC) or mainframe.

Although the method and apparatus for tuning a parameter of a Kalman filter in a wheel inspection for a vehicle of the present invention have been described in detail with some exemplary embodiments, these embodiments are not exhaustive, and those skilled in the art can realize various changes and modifications within the spirit and scope of the present invention. Therefore, the present invention is not limited to these embodiments, the scope of which is not limited by the appended claims.

The invention claimed is:

1. A method for tuning a parameter of a Kalman filter in a wheel inspection for a vehicle, comprising:
   associating wheel inspection data of said vehicles with locations of corresponding wheels in said vehicle;
   evaluating a wheel stable score of said vehicle based on said wheel inspection data and said association, wherein said wheel stable score indicates reliability of said wheel inspection, the wheel stable score calculated according to a wheel diameter differential of left and right wheels coupled to a common axis; and
   dynamically tuning a measurement error covariance (R) of said Kalman filter according to said evaluated wheel stable score.

2. The method according to claim 1, wherein associating wheel inspection data of said vehicle with locations of said corresponding wheels in said vehicle comprises:
   identifying said locations of said corresponding wheels in said vehicle;
   determining said location in said vehicle for at least one of an axle, a bogie and a car where said wheel is located; and
   establishing an association among said wheel inspection data, the locations of said wheels and the location of the at least one of said axle, said bogie and said car where said wheel is located.

3. The method according to claim 2, wherein evaluating a wheel stable score of said vehicle based on said wheel inspection data and said association comprises:
   calculating at least one of an axle stable score, a bogie stable score and a car stable score of said wheels based on said association among said wheel inspection data, said locations of said wheels and said location of the at least one of said axle, said bogie and said car where said wheel is located; and
   calculating said wheel stable score based on the at least one of said axle stable score, said bogie stable score and said car stable score.

4. The method according to claim 3, wherein calculating said axle stable score of said wheels comprises:
   calculating an average value of coaxial wheel inspection data differences between the left and right wheels in the respective same axles;
   calculating a current coaxial wheel inspection data difference deviation score based on said average value of the coaxial wheel inspection data differences and a mean value and a variance value of a predetermined normal distribution of coaxial wheel inspection data differences; and
   determining the axle stable score of the wheels according to the current coaxial wheel inspectional data difference deviation score.

5. The method according to claim 3, wherein calculating said bogie stable score of said wheels comprises:

calculating, for each bogie, a wheel inspection data difference between the left wheels in said bogie and a wheel inspection data difference between the right wheels in said bogie as a co-bogie wheel inspection data difference for said bogie;

calculating an average value of said co-bogie wheel inspection data differences;

calculating a current co-bogie wheel inspection data difference deviation score based on the average value of the co-bogie wheel inspection data differences and a mean value and a variance value of a predetermined normal distribution of co-bogie wheel inspection data differences; and determining said bogie stable score of said wheels according to said current co-bogie wheel inspection data difference deviation score.

6. The method according to claim 3, wherein calculating said car stable score of said wheels comprises:

calculating average values of said wheel inspection data of the left and right wheels in the respective bogies in the same car, and calculating wheel inspection data differences between the bogies as co-car wheel inspection data differences;

calculating an average value of said co-car wheel inspection data differences;

calculating a current co-car wheel inspection data difference deviation score based on the average value of the co-car wheel inspection data differences and a mean value and a variance value of a predetermined normal distribution of co-car wheel inspection data differences; and determining said car stable score of said wheels according to said current co-car wheel inspection data difference deviation score.

7. The method according to claim 3, wherein said wheel stable score is calculated as a weight sum of said axle stable score, said bogie stable score and said car stable score, wherein each of said weights of said axle stable score, said bogie stable score and the car stable score is within a range of 0 to 1, and the sum of said weights is equal to 1.

8. The method according to claim 1, wherein tuning said measurement error covariance of said Kalman filter comprises:

comparing said wheel stable score with a predetermined stable threshold; and provided that the wheel stable score is not less than the stable threshold, tuning said measurement error covariance.

9. The method according to claim 8, wherein tuning said measurement error covariance of said Kalman filter further comprises:

determining, provided that said wheel stable score is not less than said stable threshold, whether a number of times of consecutive occurrences when said wheel stable score is not less than the stable threshold exceeds a predetermined value; and tuning said measurement error covariance provided that said number of times of consecutive occurrences exceeds said predetermined value.

10. The method according to 9, wherein said measurement error covariance is tuned according to the following formula:

$$R = A(f(\text{StableIndex}) - f(\text{StableIndex}_{threshold})) + R_0 \quad (18)$$

where represents tuned measurement error covariance, A is a constant, represents a linear function, represents calculated wheel stable score, represents stable threshold, and represents initial measurement error covariance.

11. A non-transitory computer readable article of manufacture tangibly embodying computer readable instructions which, when executed, cause a computer to carry out the steps of a method for tuning a parameter of a Kalman filter in a wheel inspection for a vehicle, the method comprising:

associating wheel inspection data of said vehicle with locations of corresponding wheels in said vehicle;

evaluating a wheel stable score of said vehicle based on said wheel inspection data and said association, wherein said wheel stable score indicates reliability of said wheel inspection, the wheel stable score calculated according to a wheel diameter differential of left and right wheels coupled to a common axis; and dynamically tuning a measurement error covariance (R) of said Kalman filter according to said evaluated wheel stable score.

* * * * *